US012772198B2

(12) United States Patent
Yu et al.

(10) Patent No.: US 12,772,198 B2
(45) Date of Patent: Oct. 20, 2026

(54) METHOD AND APPARATUS FOR SIDELINK POSITIONING REFERENCE SIGNAL TRANSMISSION

(71) Applicant: Lenovo (Beijing) Limited, Beijing (CN)

(72) Inventors: Xiaodong Yu, Beijing (CN); Haipeng Lei, Beijing (CN); Zhennian Sun, Beijing (CN); Jie Hu, Beijing (CN); Xin Guo, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 212 days.

(21) Appl. No.: 18/684,753

(22) PCT Filed: Aug. 20, 2021

(86) PCT No.: PCT/CN2021/113833
§ 371 (c)(1),
(2) Date: Feb. 19, 2024

(87) PCT Pub. No.: WO2023/019569
PCT Pub. Date: Feb. 23, 2023

(65) Prior Publication Data

US 2024/0373397 A1 Nov. 7, 2024

(51) Int. Cl.
*H04W 64/00* (2009.01)
*H04L 5/00* (2006.01)
*H04W 52/52* (2009.01)

(52) U.S. Cl.
CPC ........... *H04W 64/00* (2013.01); *H04L 5/0051* (2013.01); *H04W 52/52* (2013.01)

(58) Field of Classification Search
CPC ... H04L 5/0048; H04L 5/0094; H04L 5/0051; H04L 5/0044; H04W 64/00; H04W 72/02
See application file for complete search history.

(56) References Cited

U.S. PATENT DOCUMENTS

2021/0058889 A1 2/2021 Zhang et al.
2022/0365163 A1* 11/2022 Baek ...................... H04W 56/00
2022/0416976 A1* 12/2022 Baek ...................... H04L 5/0051
2023/0015004 A1* 1/2023 Wu ...................... H04W 72/044
2023/0048608 A1* 2/2023 Ren ...................... H04L 5/0053
(Continued)

FOREIGN PATENT DOCUMENTS

CN 112583553 A 3/2021
CN 113055136 A 6/2021

OTHER PUBLICATIONS

PCT/CN2021/113833 , "International Preliminary Report on Patentability", International Application No. PCT/CN2021/113833, Feb. 13, 2024, 4 pages.
(Continued)

*Primary Examiner* — Mirza F Alam
(74) *Attorney, Agent, or Firm* — FIG. 1 Patents

(57) ABSTRACT

Embodiments of the present disclosure relate to sidelink (SL) positioning reference signal (PRS) transmission in a wireless communication system. According to some embodiments of the disclosure, a method performed by a user equipment (UE) may include: transmitting a sidelink (SL) positioning reference signal (PRS) on an unlicensed band according to an SL PRS configuration.

20 Claims, 8 Drawing Sheets

(56) References Cited

U.S. PATENT DOCUMENTS

2023/0052126 A1* 2/2023 Nam ......................... H04L 5/00

OTHER PUBLICATIONS

PCT/CN2021/113833 , "International Search Report and Written Opinion", International Application No. PCT/CN2021/113833, Mar. 28, 2022, 6 pages.

Qualcomm Incorporated , "On unlicensed positioning an applicable use cases", RP-192527 3GPP RAN #86, retrieved from the internet on May 17, 2024, <https://www.3gpp.org/ftp/tsg_ran/TSG_RAN/TSGR_86/Docs/>, Dec. 9, 2019, 12 pages.

* cited by examiner

METHOD AND APPARATUS FOR SIDELINK POSITIONING REFERENCE SIGNAL TRANSMISSION

TECHNICAL FIELD

Embodiments of the present disclosure generally relate to wireless communication technology, and more particularly to sidelink (SL) positioning reference signal (PRS) transmission in a wireless communication system.

BACKGROUND

Wireless communication systems are widely deployed to provide various telecommunication services, such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems, such as long term evolution (LTE) systems, LTE-advanced (LTE-A) systems, or LTE-A Pro systems, and fifth generation (5G) systems which may also be referred to as new radio (NR) systems.

In some wireless communication systems, a user equipment (UE) may communicate with another UE via a data path supported by an operator's network, e.g., a cellular or a Wi-Fi network infrastructure. The data path supported by the operator's network may include a base station (BS) and multiple gateways.

Some wireless communication systems may support sidelink communications, in which devices (e.g., UEs) that are relatively close to each other may communicate with one another directly via a sidelink (SL), rather than being linked through the BS. The term "SL" may refer to a direct radio link established for communicating among devices, as opposed to communicating via the cellular infrastructure (e.g., uplink and downlink). The term "SL" may also be referred to as a sidelink communication link.

The industry desires technologies for SL positioning reference signal (PRS) transmission in a communication system.

SUMMARY

Some embodiments of the present disclosure provide a method for wireless communication. The method may include: transmitting a sidelink (SL) positioning reference signal (PRS) on an unlicensed band according to an SL PRS configuration, wherein the SL PRS configuration may indicate information associated with at least one SL PRS transmission burst in a slot, each of the at least one SL PRS transmission burst may include at least one of a sensing region, an automatic gain control (AGC) region, and a PRS region, and the SL PRS may be transmitted on a first SL PRS transmission burst of the at least one SL PRS transmission burst; and wherein the information associated with at least one SL PRS transmission burst may indicate at least one of: the number of symbols of the sensing region of the at least one SL PRS transmission burst, the number of symbols of the AGC region of the at least one SL PRS transmission burst, the number of symbols of the PRS region of the at least one SL PRS transmission burst, and the starting symbol of the AGC region of the at least one SL PRS transmission burst or the starting symbol of the PRS region of the at least one SL PRS transmission burst.

In some embodiments of the present disclosure, the information associated with at least one SL PRS transmission burst may further indicate the number of SL PRS transmission bursts in the slot. The SL PRS configuration may further indicate an effective time of the SL PRS configuration. The SL PRS configuration may be received on a downlink or a SL.

In some embodiments of the present disclosure, the method may further include transmitting an SL PRS indication on a licensed band, wherein the SL PRS indication may indicate the first SL PRS transmission burst of the at least one SL PRS transmission burst. In some embodiments of the present disclosure, the method may further include receiving an SL PRS request on the licensed band, wherein the transmission of the SL PRS indication may be in response to the SL PRS request. The method may further include transmitting the SL PRS configuration scheduled by the SL PRS indication on the licensed band.

In some embodiments of the present disclosure, the method may further include receiving an SL PRS indication on a licensed band, wherein the SL PRS indication may indicate the first SL PRS transmission burst of the at least one SL PRS transmission burst. The method may further include receiving the SL PRS configuration scheduled by the SL PRS indication on the licensed band. The SL PRS indication may be received on a downlink or a SL.

The SL PRS indication may indicate an offset between a slot where the SL PRS indication may be transmitted on the licensed band and a slot where the SL PRS may be transmitted on the unlicensed band. The SL PRS indication may include a field to indicate the first SL PRS transmission burst, and the size of the field may be determined based on the number of SL PRS transmission bursts in the slot.

Some embodiments of the present disclosure provide a method for wireless communication. The method may include: receiving a sidelink (SL) positioning reference signal (PRS) on an unlicensed band according to an SL PRS configuration, wherein the SL PRS configuration may indicate information associated with at least one SL PRS transmission burst in a slot, each of the at least one SL PRS transmission burst may include at least one of a sensing region, an automatic gain control (AGC) region, and a PRS region, and the SL PRS may be received on a first SL PRS transmission burst of the at least one SL PRS transmission burst; and wherein the information associated with at least one SL PRS transmission burst may indicate at least one of: the number of symbols of the sensing region of the at least one SL PRS transmission burst, the number of symbols of the AGC region of the at least one SL PRS transmission burst, the number of symbols of the PRS region of the at least one SL PRS transmission burst, and the starting symbol of the AGC region of the at least one SL PRS transmission burst or the starting symbol of the PRS region of the at least one SL PRS transmission burst.

The information associated with at least one SL PRS transmission burst may further indicate the number of SL PRS transmission bursts in the slot. The SL PRS configuration may further indicate an effective time of the SL PRS configuration. The SL PRS configuration may be received on a downlink or a SL.

In some embodiments of the present disclosure, the method may further include receiving an SL PRS indication on a licensed band, wherein the SL PRS indication may indicate the first SL PRS transmission burst of the at least one SL PRS transmission burst. The SL PRS indication may be received on a downlink (DL) or a SL. The method may further include transmitting an SL PRS request on the licensed band, wherein the reception of the SL PRS indication may be in response to the SL PRS request. The method may further include receiving the SL PRS configuration scheduled by the SL PRS indication on the licensed band.

In some embodiments of the present disclosure, the method may further include transmitting an SL PRS indication on a licensed band, wherein the SL PRS indication may indicate the first SL PRS transmission burst of the at least one SL PRS transmission burst. The method may further include transmitting the SL PRS configuration scheduled by the SL PRS indication on the licensed band.

In some embodiments of the present disclosure, the SL PRS indication may indicate an offset between a slot where the SL PRS indication may be transmitted on the licensed band and a slot where the SL PRS may be transmitted on the unlicensed band. The SL PRS indication may include a field to indicate the first SL PRS transmission burst, and the size of the field may be determined based on the number of SL PRS transmission bursts in the slot.

Some embodiments of the present disclosure provide a method for wireless communication. The method may include: transmitting an SL PRS configuration on a downlink, wherein the SL PRS configuration may indicate information associated with at least one SL PRS transmission burst in a slot on an unlicensed band, each of the at least one SL PRS transmission burst may include at least one of a sensing region, an automatic gain control (AGC) region, and a PRS region; and wherein the information associated with at least one SL PRS transmission burst may indicate at least one of: the number of symbols of the sensing region of the at least one SL PRS transmission burst, the number of symbols of the AGC region of the at least one SL PRS transmission burst, the number of symbols of the PRS region of the at least one SL PRS transmission burst, and the starting symbol of the AGC region of the at least one SL PRS transmission burst or the starting symbol of the PRS region of the at least one SL PRS transmission burst.

In some embodiments of the present disclosure, the method may further include transmitting an SL PRS indication on the downlink, wherein the SL PRS indication may schedule the SL PRS configuration and may indicate a first SL PRS transmission burst of the at least one SL PRS transmission burst. In some embodiments, the SL PRS indication may indicate an offset between a slot where the SL PRS indication may be transmitted on the downlink and a slot where an SL PRS may be transmitted in the first SL PRS transmission burst on the unlicensed band. In some embodiments, the SL PRS indication may include a field to indicate the first SL PRS transmission burst, and the size of the field may be determined based on the number of SL PRS transmission bursts in the slot. In some embodiments, the method may further include transmitting an SL PRS request on the downlink, wherein the transmission of the SL PRS indication may be in response to the SL PRS request.

Some embodiments of the present disclosure provide an apparatus. According to some embodiments of the present disclosure, the apparatus may include: a transceiver; and a processor coupled to the transceiver, wherein the transceiver and the processor may interact with each other so as to perform a method according to some embodiments of the present disclosure.

Some embodiments of the present disclosure provide a UE. The UE may include a processor; and a transceiver coupled to the processor, wherein the transceiver may be configured to: transmit a sidelink (SL) positioning reference signal (PRS) on an unlicensed band according to an SL PRS configuration, wherein the SL PRS configuration may indicate information associated with at least one SL PRS transmission burst in a slot, each of the at least one SL PRS transmission burst may include at least one of a sensing region, an automatic gain control (AGC) region, and a PRS region, and the SL PRS may be transmitted on a first SL PRS transmission burst of the at least one SL PRS transmission burst; and wherein the information associated with at least one SL PRS transmission burst may indicate at least one of: the number of symbols of the sensing region of the at least one SL PRS transmission burst, the number of symbols of the AGC region of the at least one SL PRS transmission burst, the number of symbols of the PRS region of the at least one SL PRS transmission burst, and the starting symbol of the AGC region of the at least one SL PRS transmission burst or the starting symbol of the PRS region of the at least one SL PRS transmission burst.

The information associated with at least one SL PRS transmission burst may further indicate the number of SL PRS transmission bursts in the slot. The SL PRS configuration may further indicate an effective time of the SL PRS configuration. The SL PRS configuration may be received on a downlink or a SL.

The transceiver may be further configured to transmit an SL PRS indication on a licensed band, wherein the SL PRS indication may indicate the first SL PRS transmission burst of the at least one SL PRS transmission burst. The transceiver may be further configured to receive an SL PRS request on the licensed band, wherein the transmission of the SL PRS indication may be in response to the SL PRS request. The transceiver may be further configured to transmit the SL PRS configuration scheduled by the SL PRS indication on the licensed band.

The transceiver may be further configured to receive an SL PRS indication on a licensed band, wherein the SL PRS indication may indicate the first SL PRS transmission burst of the at least one SL PRS transmission burst. The transceiver may be further configured to receive the SL PRS configuration scheduled by the SL PRS indication on the licensed band. The SL PRS indication may be received on a downlink or a SL.

The SL PRS indication may indicate an offset between a slot where the SL PRS indication may be transmitted on the licensed band and a slot where the SL PRS may be transmitted on the unlicensed band. The SL PRS indication may include a field to indicate the first SL PRS transmission burst, and the size of the field may be determined based on the number of SL PRS transmission bursts in the slot.

Some embodiments of the present disclosure provide a UE. The UE may include a processor; and a transceiver coupled to the processor, wherein the transceiver may be configured to: receive a sidelink (SL) positioning reference signal (PRS) on an unlicensed band according to an SL PRS configuration, wherein the SL PRS configuration may indicate information associated with at least one SL PRS transmission burst in a slot, each of the at least one SL PRS transmission burst may include at least one of a sensing region, an automatic gain control (AGC) region, and a PRS region, and the SL PRS may be received on a first SL PRS transmission burst of the at least one SL PRS transmission burst; and wherein the information associated with at least one SL PRS transmission burst may indicate at least one of: the number of symbols of the sensing region of the at least one SL PRS transmission burst, the number of symbols of the AGC region of the at least one SL PRS transmission burst, the number of symbols of the PRS region of the at least one SL PRS transmission burst, and the starting symbol of the AGC region of the at least one SL PRS transmission burst or the starting symbol of the PRS region of the at least one SL PRS transmission burst.

The information associated with at least one SL PRS transmission burst may further indicate the number of SL PRS transmission bursts in the slot. The SL PRS configuration may further indicate an effective time of the SL PRS configuration. The SL PRS configuration may be received on a downlink or a SL.

The transceiver may be further configured to receive an SL PRS indication on a licensed band, wherein the SL PRS indication may indicate the first SL PRS transmission burst of the at least one SL PRS transmission burst. The SL PRS indication may be received on a downlink (DL) or a SL. The transceiver may be further configured to transmit an SL PRS request on the licensed band, wherein the reception of the SL PRS indication may be in response to the SL PRS request. The transceiver may be further configured to receive the SL PRS configuration scheduled by the SL PRS indication on the licensed band.

The transceiver may be further configured to transmit an SL PRS indication on a licensed band, wherein the SL PRS indication may indicate the first SL PRS transmission burst of the at least one SL PRS transmission burst. The transceiver may be further configured to transmit the SL PRS configuration scheduled by the SL PRS indication on the licensed band.

The SL PRS indication may indicate an offset between a slot where the SL PRS indication may be transmitted on the licensed band and a slot where the SL PRS may be transmitted on the unlicensed band. The SL PRS indication may include a field to indicate the first SL PRS transmission burst, and the size of the field may be determined based on the number of SL PRS transmission bursts in the slot.

Some embodiments of the present disclosure provide a network node. The network node may include a processor; and a transceiver coupled to the processor, wherein the transceiver may be configured to: transmit an SL PRS configuration on a downlink, wherein the SL PRS configuration may indicate information associated with at least one SL PRS transmission burst in a slot on an unlicensed band, each of the at least one SL PRS transmission burst may include at least one of a sensing region, an automatic gain control (AGC) region, and a PRS region; and wherein the information associated with at least one SL PRS transmission burst may indicate at least one of: the number of symbols of the sensing region of the at least one SL PRS transmission burst, the number of symbols of the AGC region of the at least one SL PRS transmission burst, the number of symbols of the PRS region of the at least one SL PRS transmission burst, and the starting symbol of the AGC region of the at least one SL PRS transmission burst or the starting symbol of the PRS region of the at least one SL PRS transmission burst.

The transceiver may be further configured to transmit an SL PRS indication on the downlink, wherein the SL PRS indication schedules the SL PRS configuration and may indicate a first SL PRS transmission burst of the at least one SL PRS transmission burst. The SL PRS indication may indicate an offset between a slot where the SL PRS indication may be transmitted on the downlink and a slot where an SL PRS may be transmitted in the first SL PRS transmission burst on the unlicensed band. The SL PRS indication may include a field to indicate the first SL PRS transmission burst, and the size of the field may be determined based on the number of SL PRS transmission bursts in the slot. The transceiver may be further configured to transmit an SL PRS request on the downlink, wherein the transmission of the SL PRS indication may be in response to the SL PRS request.

Some embodiments of the present disclosure provide an apparatus. According to some embodiments of the present disclosure, the apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions may be configured to, with the at least one processor, cause the apparatus to perform a method according to some embodiments of the present disclosure.

Embodiments of the present disclosure provide technical solutions to facilitate and improve the implementation of various communication technologies, such as 5G NR.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architectures and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present disclosure are also applicable to similar technical problems; and moreover, the terminologies recited in the present disclosure may change, which should not affect the principles of the present disclosure.

Figure 1:
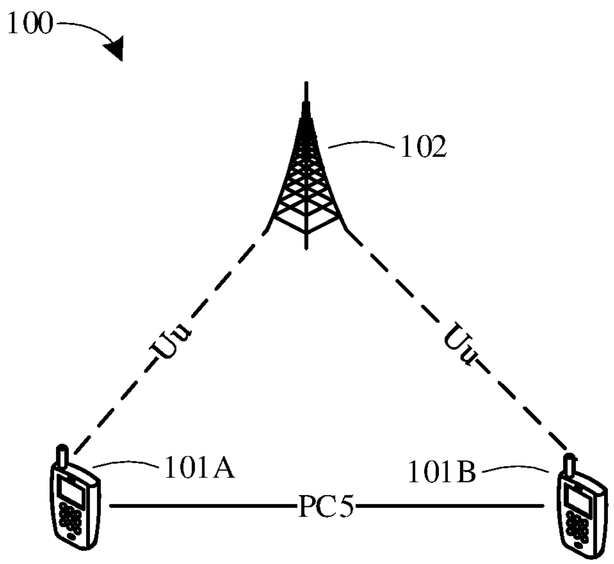
FIG. 1 illustrates a schematic diagram of a wireless communication system in accordance with some embodiments of the present disclosure.

FIG. 1 illustrates a schematic diagram of a wireless communication system 100 in accordance with some embodiments of the present disclosure.

As shown in FIG. 1, the wireless communication system 100 may support sidelink communications. Sidelink communication supports UE-to-UE direct communication. In the context of the present disclosure, sidelink communications may be categorized according to the wireless communication technologies adopted. For example, sidelink communication may include NR sidelink communication and V2X Sidelink communication.

NR sidelink communications (e.g., specified in 3GPP specification TS 38.311) may refer to access stratum (AS) functionality enabling at least vehicle-to-everything (V2X) communications as defined in 3GPP specification TS 23.287 between neighboring UEs, using NR technology but not traversing any network node. V2X sidelink communications (e.g., specified in 3GPP specification TS 36.311) may refer to AS functionality enabling V2X communications as defined in 3GPP specification TS 23.285 between neighboring UEs, using evolved-universal mobile telecommunication system (UMTS) terrestrial radio access (UTRA) (E-UTRA) technology, but not traversing any network node. However, if not being specified, "sidelink communications" may refer to NR sidelink communications, V2X sidelink communications, or any sidelink communications adopting other wireless communication technologies.

Referring to FIG. 1, the wireless communication system 100 may include a base station (e.g., BS 102) and some UEs (e.g., UE 101A and UE 101B). Although a specific number of UEs and BSs is depicted in FIG. 1, it is contemplated that any number of UEs and BSs may be included in the wireless communication system 100.

The UEs and the BS may support communication based on, for example, 3G, long-term evolution (LTE), LTE-advanced (LTE-A), new radio (NR), or other suitable protocol(s). In some embodiments of the present disclosure, a BS (e.g., BS 102) may be referred to as an access point, an access terminal, a base, a base unit, a macro cell, a Node-B, an evolved Node B (eNB), a gNB, an ng-eNB, a Home Node-B, a relay node, or a device, or described using other terminology used in the art. A UE (e.g., UE 101A or UE 101B) may include, for example, but is not limited to, a computing device, a wearable device, a mobile device, an IoT device, a road side unit (RSU), a vehicle, etc. Persons skilled in the art should understand that as technology develops and advances, the terminologies described in the present disclosure may change, but should not affect or limit the principles and spirit of the present disclosure.

In the example of FIG. 1, the BS 102 may be included in a next generation radio access network (NG-RAN). The UE 101A and UE 101B may be in-coverage (e.g., inside the NG-RAN). For example, as shown in FIG. 1, the UE 101A and the UE 101B may be within the coverage of BS 102. The UE 101A and UE 101B may respectively connect to the BS 102 via a network interface, for example, the Uu interface as specified in 3GPP standard documents. The link established between a UE (e.g., UE 101A) and a BS (e.g., BS 102) may be referred to as a Uu link. The UE 101A and UE 101B may communicate with the BS 102 via respective uplink (UL) communication signals. The BS 102 may communicate with UE 101A and UE 101B via respective downlink (DL) communication signals. The UE 101A and UE 101B may be connected via a sidelink, for example, a PC5 interface as specified in 3GPP standard documents. In some other examples, the UE 101A, the UE 101B, or both may be out-of-coverage (e.g., outside the coverage of the NG-RAN). The UE 101A and the UE 101B may communicate with each other via a sidelink.

In some embodiments of the present disclosure, UE 101A may function as a transmitting UE, and UE 101B may function as a receiving UE. UE 101A may transmit information or data to UE 101B, through sidelink unicast, sidelink groupcast, or sidelink broadcast. For instance, UE 101A may transmit data to UE 101B in a sidelink unicast session. UE 101A may transmit data to UE 101B and other UEs in a groupcast group (not shown in FIG. 1) by a sidelink groupcast transmission session. UE 101A may transmit data to UE 101B and other UEs (not shown in FIG. 1) by a sidelink broadcast transmission session.

The wireless communication system 100 may be compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

In some embodiments of the present disclosure, the wireless communication system 100 is compatible with 5G NR of the 3GPP protocol. For example, BS 102 may transmit data using an orthogonal frequency division multiple (OFDM) modulation scheme on the DL and the UE 101A or 101B may transmit data on the UL using a discrete Fourier transform-spread-orthogonal frequency division multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present disclosure, the BS 102 and UE 101A (or UE 101B) may communicate using other communication protocols, such as the IEEE 802.11 family of wireless communication protocols. Further, in some embodiments of the present disclosure, the BS 102 and UE 101A (or UE 101B) may communicate over licensed spectrums, whereas in some other embodiments, the BS 102 and UE 101A (or UE 101B) may communicate over unlicensed spectrums. UE 101A and UE 101B may communicate with each other over licensed or unlicensed spectrums.

The present disclosure is not intended to be limited to the implementation of any particular wireless communication system architecture or protocol.

There is strong demand from industries such as the automotive vertical industry that require the support of sidelink positioning. Sidelink positioning provides a new positioning method that fits the industry's various application scenarios. Sidelink positioning, which can be relative or absolute positioning, may include, for example, transmitting positioning reference signals (PRS) over the sidelink. Sidelink positioning has various advantages including, for example, it can operate independent of network or radio access technology (RAT) coverage, and it is very valuable when network based positioning or other positioning methods are not available.

Embodiments of the present disclosure provide solutions to facilitate sidelink positioning. For example, it is considered that the bandwidth of an intelligent transport system (ITS) is very limited and operators may not want to use their licensed spectrum for an SL purpose. It would be beneficial if the SL PRS can be transmitted on unlicensed spectrums. More details on the embodiments of the present disclosure will be illustrated in the following text in combination with the appended drawings.

In some embodiments of the present disclosure, an SL PRS may be transmitted on an SL PRS transmission burst on an unlicensed band. An SL PRS transmission burst on an unlicensed band may include at least one of a sensing region, an automatic gain control (AGC) region, and a PRS region. The sensing region may be used for a listen-before-talk (LBT) test. The PRS region may be used for carrying the SL PRS. In some examples, when an SL PRS transmission burst does not include an AGC region, a part (e.g., half a symbol or more) of the PRS region may be used for automatic gain control, if needed.

A UE can be configured or indicated with an SL PRS configuration for SL PRS transmission bursts via a sidelink or a downlink. The SL PRS configuration may indicate at least one SL PRS transmission burst in a slot. For each of the at least one SL PRS transmission burst, the SL PRS configuration may indicate at least one of: the number of symbols of the sensing region of the corresponding SL PRS transmission burst, the number of symbols of the AGC region of the corresponding SL PRS transmission burst, the number of symbols of the PRS region of the corresponding SL PRS transmission burst, and the starting symbol of the AGC region of the corresponding SL PRS transmission burst or the starting symbol of the PRS region of the corresponding SL PRS transmission burst. In some embodiments, the SL PRS configuration may also indicate the number of SL PRS transmission bursts in the slot.

Figure 2:
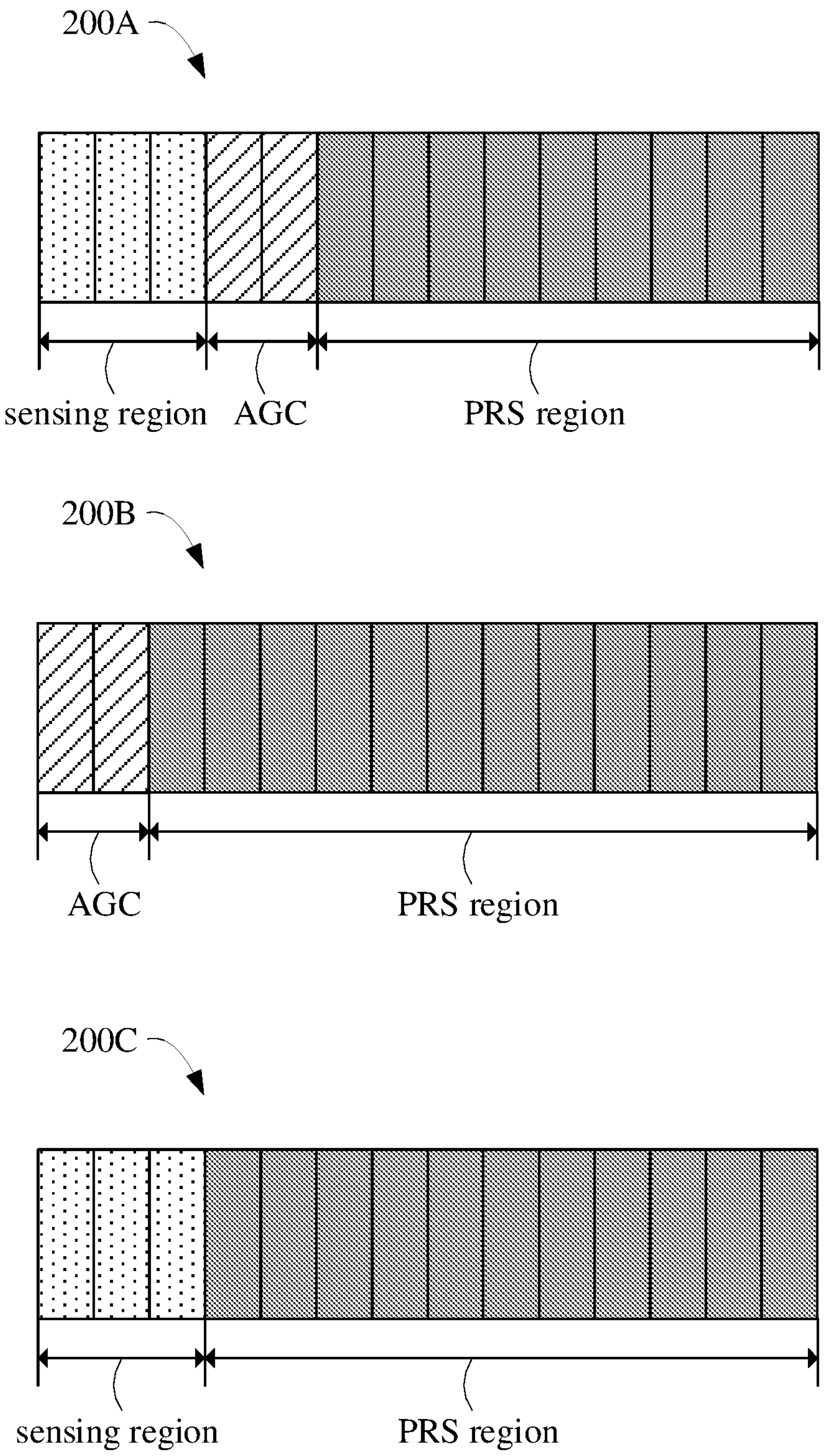
FIG. 2 illustrates exemplary SL PRS transmission bursts in accordance with some embodiments of the present disclosure.

FIG. 2 illustrates exemplary SL PRS transmission bursts 200A-200C in accordance with some embodiments of the present disclosure. As shown in FIG. 2, SL PRS transmission bursts 200A-200C may occupy a slot on an unlicensed band. The first symbol to the last symbol of the slot can be denoted as symbol #0 to symbol #13.

In FIG. 2, SL PRS transmission burst 200A may include a sensing region, an AGC region, and a PRS region. The sensing region of SL PRS transmission burst 200A starts from symbol #0 and occupies 3 symbols. The AGC region of SL PRS transmission burst 200A starts from symbol #3 and occupies 2 symbols. The PRS region of SL PRS transmission burst 200A starts from symbol #5 and occupies 9 symbols. The SL PRS transmission burst 200A can be presented in various forms. For example, to indicate SL PRS transmission burst 200A, the SL PRS configuration may indicate: the number of symbols for the sensing region (3 symbols), the number of symbols for the AGC region (2 symbols), the number of symbols for the PRS region (9 symbols), and the starting symbol of the AGC region (symbol #3). For instance, SL PRS transmission burst 200A may be indicated as {3, 2, 9, 3}. In another example, the starting symbol of the PRS region (symbol #5) may be indicated, that is, SL PRS transmission burst 200A may be indicated as {3, 2, 9, 5}. In yet another example, since SL PRS transmission burst 200A occupies the whole slot, any of the starting symbols may not need to be indicated. That is, SL PRS transmission burst 200A may be indicated as {3, 2, 9}. In other words, when no starting symbol is indicated, it may suggest that an SL PRS transmission burst may start from a specific position (e.g., symbol #0) in a slot.

SL PRS transmission burst 200B may include an AGC region and a PRS region. The size of the sensing region may be indicated, configured, preconfigured, or predefined as 0. The AGC region of SL PRS transmission burst 200B starts from symbol #0 and occupies 2 symbols. The PRS region of SL PRS transmission burst 200B starts from symbol #2 and occupies 12 symbols. For instance, SL PRS transmission burst 200A may be indicated as {2, 12, 0}, {2, 12, 2} or {2, 12}.

SL PRS transmission burst 200C may include a sensing region and a PRS region. The size of the AGC region may be indicated, configured, preconfigured or predefined as 0. The sensing region of SL PRS transmission burst 200C starts from symbol #0 and occupies 3 symbols. The PRS region of SL PRS transmission burst 200C starts from symbol #3 and occupies 11 symbols. For instance, SL PRS transmission burst 200A may be indicated as {3, 11, 0}, {3, 11, 3} or {3, 11}.

It should be understood that FIG. 2 is only for illustrative purposes, and should not be construed as limiting the embodiments of the present disclosure. For example, the sensing region, AGC region, or PRS region of an SL PRS transmission burst may include more or fewer symbols in some other embodiments of the present disclosure. For example, an SL PRS transmission burst may not occupy all symbols of a slot in some other embodiments of the present disclosure.

Figure 3:
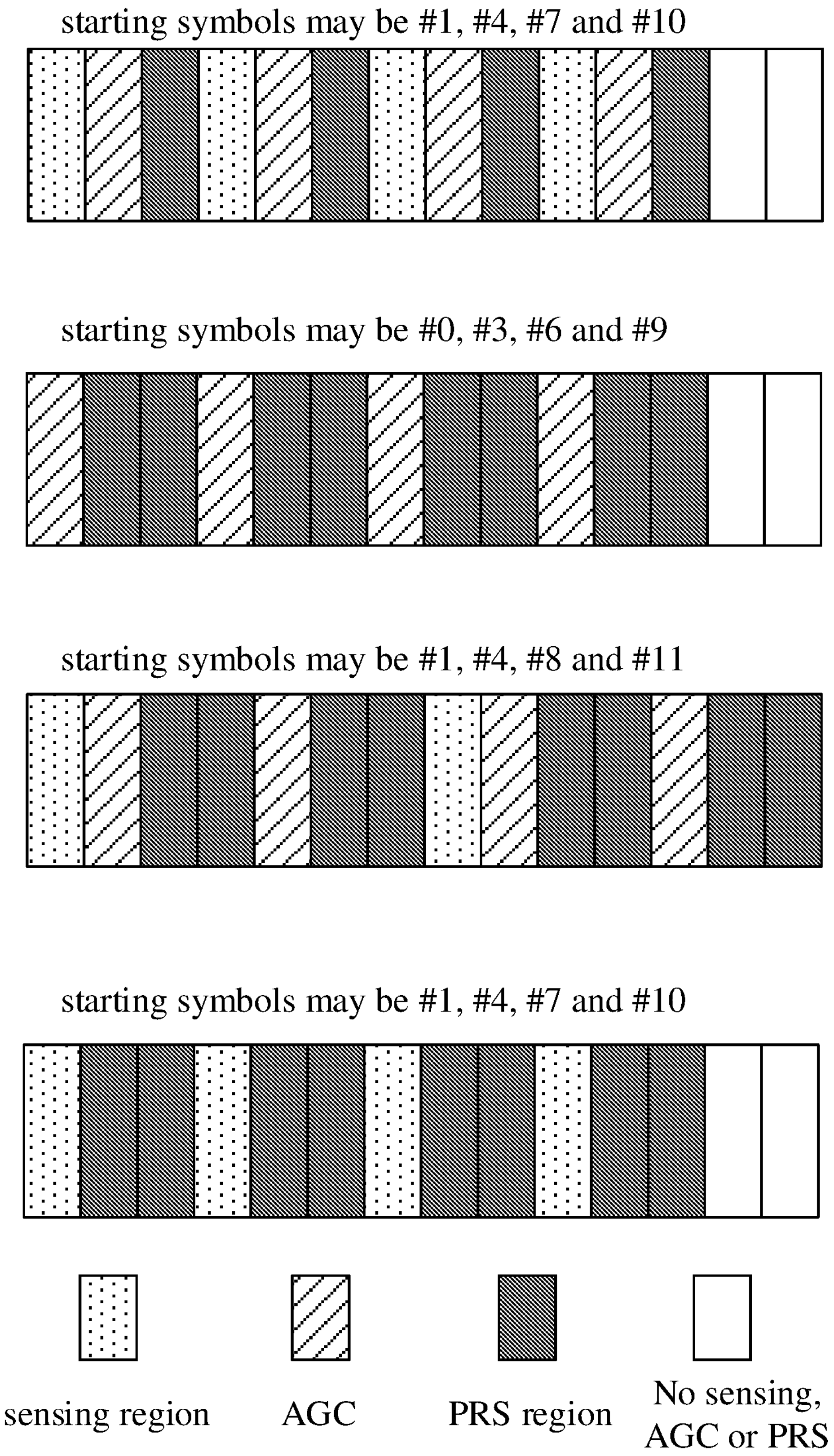
FIG. 3 illustrates exemplary SL PRS transmission bursts in accordance with some embodiments of the present disclosure.
Figure 4:
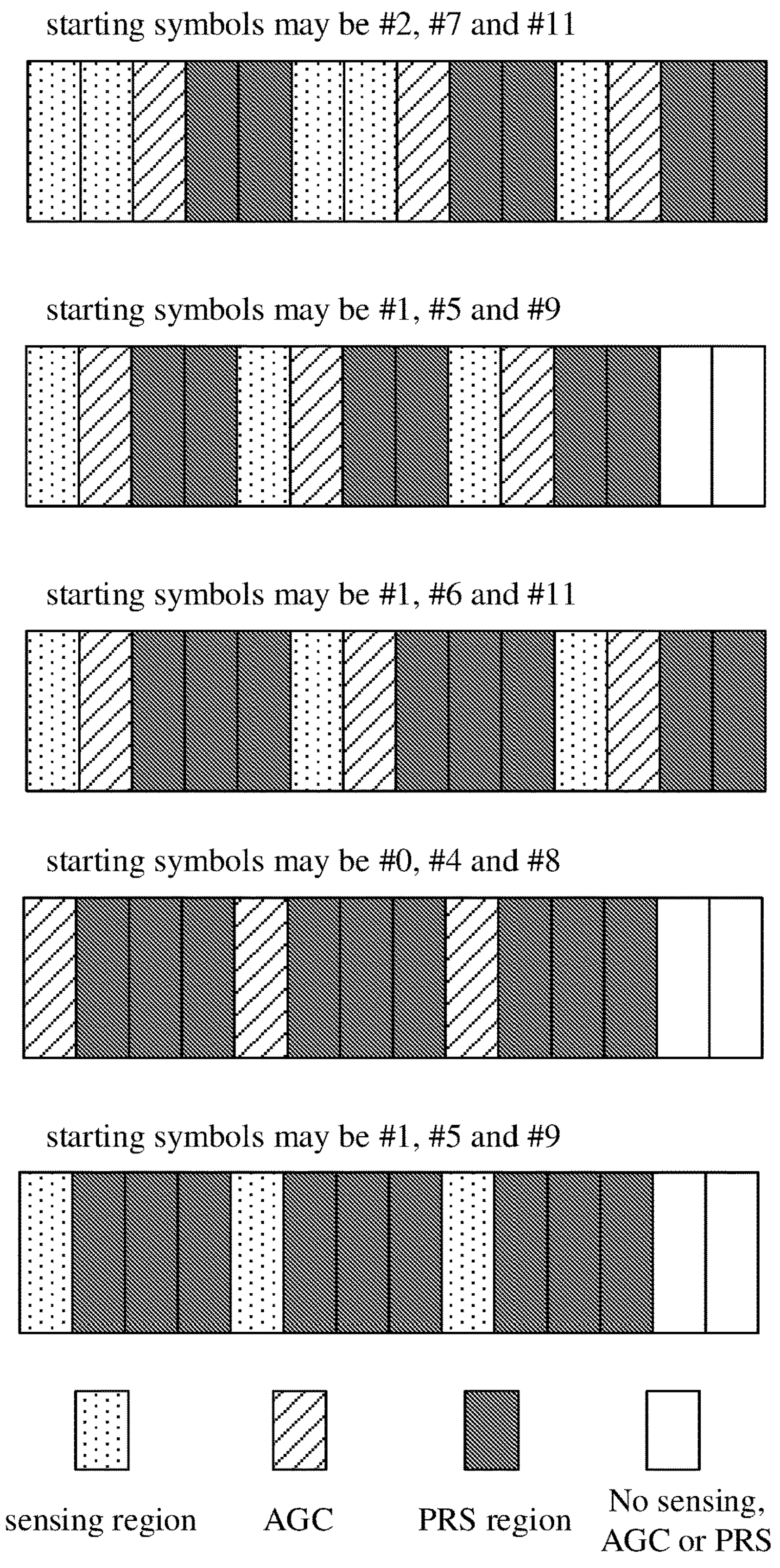
FIG. 4 illustrates exemplary SL PRS transmission bursts in accordance with some embodiments of the present disclosure.
Figure 5:
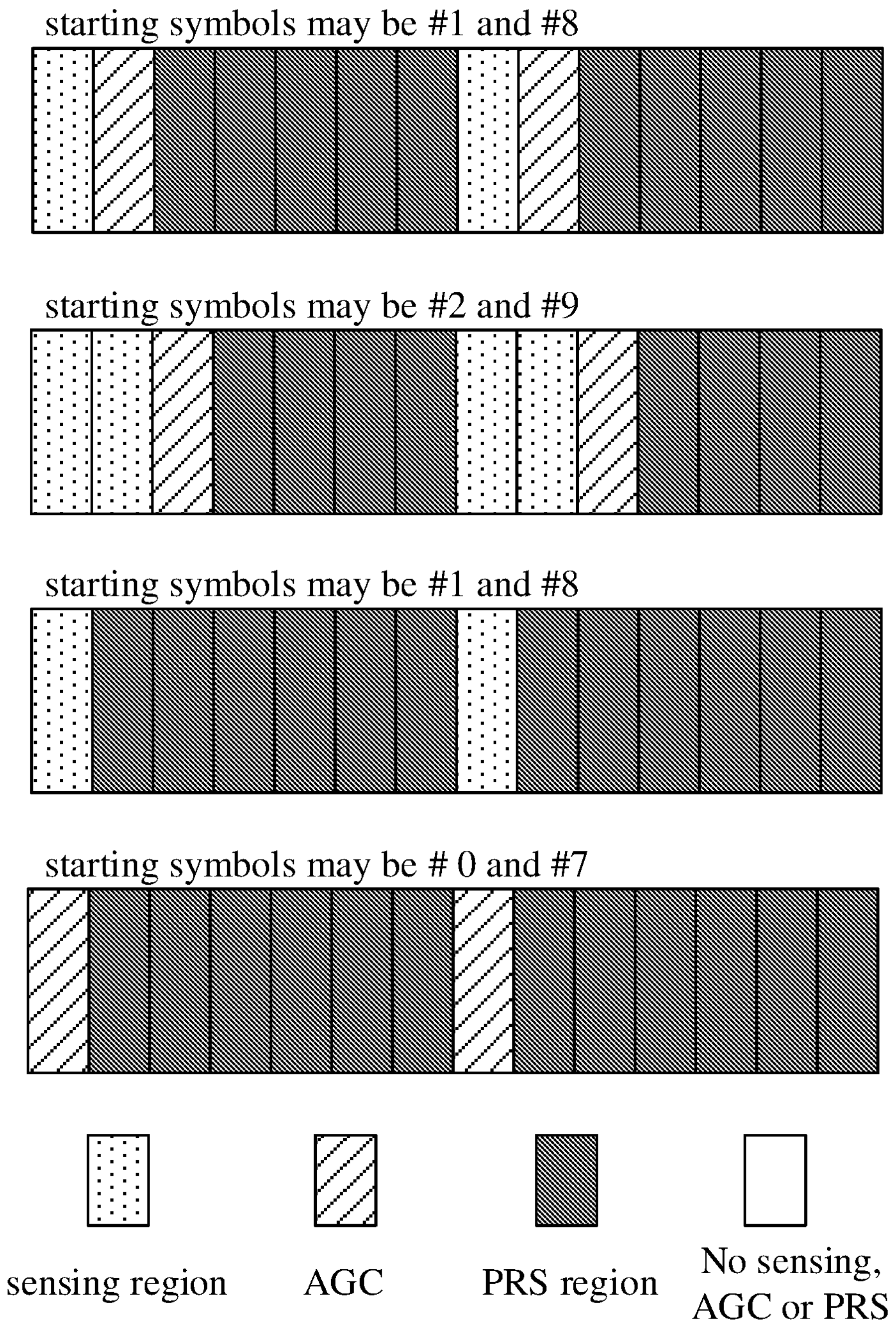
FIG. 5 illustrates exemplary SL PRS transmission bursts in accordance with some embodiments of the present disclosure.

FIGS. 3-5 illustrate exemplary SL PRS transmission bursts in accordance with some embodiments of the present disclosure. It should be understood that FIGS. 3-5 are only for illustrative purposes, and should not be construed as limiting the embodiments of the present disclosure.

As shown in FIGS. 3-5, there is a plurality of SL PRS transmission bursts in a slot on an unlicensed band. The plurality of SL PRS transmission bursts may be used by one or more UEs for transmitting SL PRSs. The descriptions with respect to the SL PRS transmission burst in all of the foregoing embodiments may apply to each of the plurality of SL PRS transmission bursts in FIGS. 3-5 and thus are omitted herein.

In FIG. 3, 4 SL PRS transmission bursts may be included in a slot. In FIG. 4, 3 SL PRS transmission bursts may be included in a slot. In FIG. 5, 2 SL PRS transmission bursts may be included in a slot. The first symbol to the last symbol of the slot can be denoted as symbol #0 to symbol #13.

In some embodiments of the present disclosure, a network, BS, RSU or UE, can determine how an SL PRS is to be transmitted in a slot. For example, the network, BS, RSU or UE can determine the pattern of SL PRS transmission bursts in a slot. The network, BS, RSU or UE can determine the number of columns of a PRS transmission (e.g., the number of symbols of a PRS region) in an SL PRS transmission burst.

In some embodiments of the present disclosure, the network, BS, RSU or UE may make the above determination based on, for example, at least one of: the requirements of positioning measurement accuracy and the velocity of a UE, for example, the transmitting UE (also referred to as "Tx UE") or receiving UE (also referred to as "Rx UE") of the SL PRS.

For example, when a UE (e.g., a Tx UE or a Rx UE) is located in a high-speed moving scenario, a Tx UE may transmit an SL PRS transmission burst with a 6-column PRS (e.g., using an exemplary pattern shown in FIG. 5). When a UE (e.g., a Tx UE or a Rx UE) is located in a low/medium-speed moving scenario, a Tx UE may transmit an SL PRS transmission burst with a 2-column or 3-column PRS (e.g., using an exemplary pattern shown in FIGS. 3 and 4). For example, when a BS is distributed in a high-speed moving scenario, the BS may configure an in-coverage UE to transmit an SL PRS transmission burst with a 6-column PRS. Otherwise, the BS may configure the in-coverage UE to transmit an SL PRS transmission burst with a 2-column or 3-column PRS.

Figure 9:
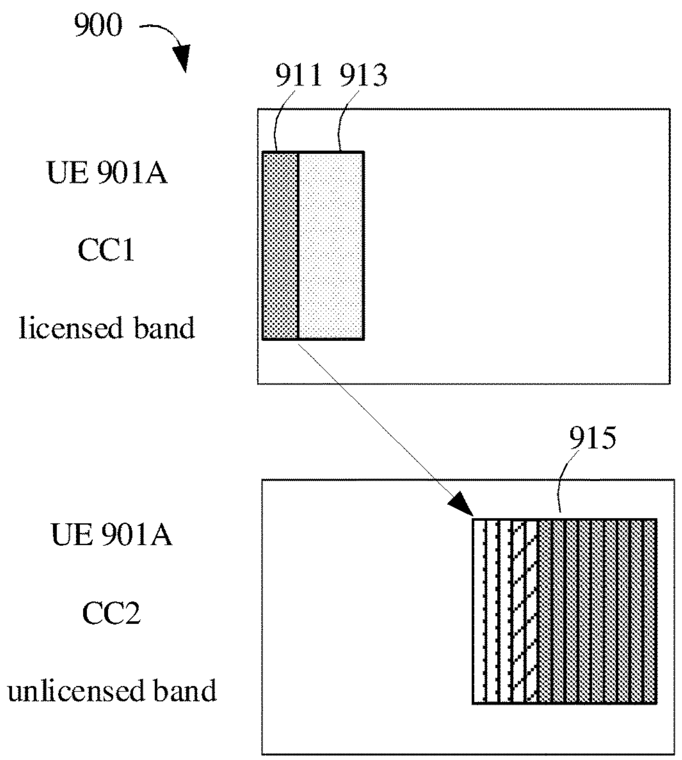
FIG. 9 illustrates a schematic diagram of configuring or indicating an SL PRS transmission in accordance with some embodiments of the present disclosure.

FIG. 9 illustrates a schematic diagram 900 of configuring or indicating an SL PRS transmission in accordance with some embodiments of the present disclosure. Details described in all of the foregoing embodiments of the present disclosure are applicable for the embodiments shown in FIG. 9.

As shown in FIG. 9, UE 901A may include two carriers, e.g., component carrier (CC) 1 and CC2, CC1 is in a licensed frequency band and CC2 is in an unlicensed frequency band. UE 901A may transmit an indication (hereinafter, "SL PRS indication") on the licensed band to indicate an SL PRS transmission burst on the unlicensed band. UE 901A will transmit an SL PRS on the indicated SL PRS transmission burst.

For example, referring to FIG. 9, the SL PRS indication may be transmitted in control part 911 on CC1 to indicate an SL PRS to be transmitted on an SL PRS transmission burst 915 on CC2. After an Rx UE (not shown in FIG. 9) receives the SL PRS indication on the licensed band, the Rx UE may expect to receive the corresponding SL PRS on the unlicensed band.

In some embodiments, the SL PRS indication may indicate SL PRS transmission burst 915 from at least one SL PRS transmission burst, which may be indicated by an SL PRS configuration. In some embodiments, the SL PRS configuration may be scheduled by the SL PRS indication in control part 901 and may be transmitted in data part 913. In some embodiments, when the SL PRS indication is transmitted, the SL PRS configuration may already be configured, and the SL PRS indication may trigger an SL PRS transmission according to the SL PRS configuration. In some embodiments, the SL PRS configuration may be configured by a higher layer (e.g., RRC) signaling.

In some embodiments, the SL PRS configuration may include information associated with at least one SL PRS transmission burst in a slot as described above. In some embodiments, the SL PRS configuration may indicate an effective time of the SL PRS configuration, that is, when the configuration will become effective after the reception of the configuration. In some embodiments, the effective time of an SL PRS configuration may be preconfigured or predefined, for example, in standard(s). The SL PRS configuration may not indicate the effective time.

In some embodiments, the SL PRS indication may indicates an offset between a slot where the SL PRS indication is transmitted on the licensed band and a slot where the SL PRS is transmitted on the unlicensed band. For example, referring to FIG. 9, the SL PRS indication may indicate a slot level offset between control part 911 and SL PRS transmission burst 915. In some embodiments, the offset may be preconfigured or predefined, for example, in standard(s). The SL PRS indication may not indicate the offset.

In some embodiments, the SL PRS indication may include a field to indicate which of the at least one SL PRS transmission burst configured in the SL PRS indication the SL PRS will be transmitted on. The size of the field may be variable and may be determined based on the number of SL PRS transmission bursts in a slot (denoted as "N"). For example, the size of the field may be determined according to $\lceil \log_2(N) \rceil$. The field may be represented in a bitmap manner (e.g., by binary values). The field may be included in the sidelink control information.

For instance, when 4 candidate SL PRS transmission bursts are configured in a slot, the size of this field may be 2 bits. For example, binary values "00", "01", "10", and "11" may represent the first, second, third, and fourth SL PRS transmission bursts in the slot, respectively. When 3 candidate SL PRS transmission bursts are configured in a slot, the size of this field may be 2 bits. For example, binary values "00", "01", and "10" may represent the first, second, and third SL PRS transmission bursts in the slot, respectively. When 2 candidate SL PRS transmission bursts are configured in a slot, the size of this field may be 1 bit. For example, binary values "O" and "1" may represent the first and second SL PRS transmission bursts in the slot, respectively.

In some embodiments, instead of indicating an SL PRS transmission burst from an SL PRS configuration, the SL PRS indication may directly indicate the SL PRS transmission burst (e.g., SL PRS transmission burst 915). The method for indicate an SL PRS transmission burst as described above may apply here. For example, the sizes of the regions in the SL PRS transmission burst and a starting symbol of a certain region may be indicated.

In some embodiments, the SL PRS configuration may be transmitted from a network, BS, RSU, or a UE. The SL PRS configuration may be transmitted on a downlink or a sidelink.

In some embodiments, the SL PRS indication may be transmitted from an RSU or a UE (e.g., UE 901A as shown in FIG. 9) on a sidelink on a licensed band. In some other embodiments, the SL PRS indication may be transmitted from the network or BS on the downlink. The above slot-level offset may represent the gap between the downlink transmission and the sidelink transmission.

Figure 6:
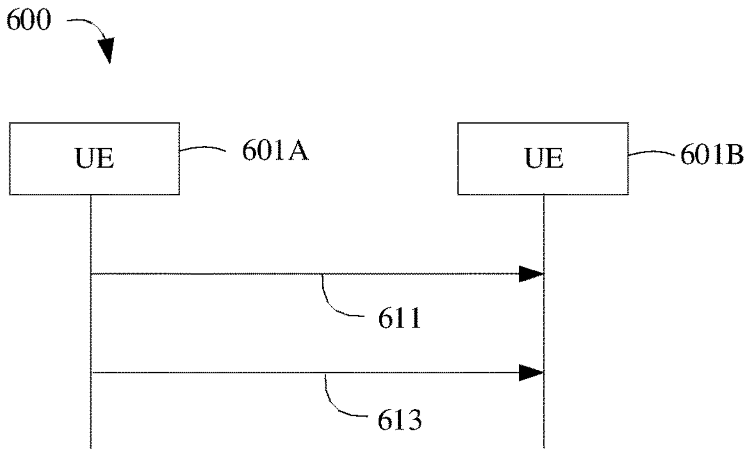
FIG. 6 illustrates a flow chart of an exemplary procedure of wireless communications in accordance with some embodiments of the present disclosure.

FIG. 6 illustrates a flow chart of an exemplary procedure 600 for indicating an SL PRS transmission in accordance with some embodiments of the present disclosure. Details described in all of the foregoing embodiments of the present disclosure are applicable for the embodiments shown in FIG. 6. In some examples, UE 601A and UE 601B may function as UE 101A or UE 101B in FIG. 1.

In operation 611, UE 601A may transmit an SL PRS indication on a licensed band to UE 601B. The SL PRS indication may indicate an SL PRS transmission burst (e.g., SL PRS transmission burst 915 in FIG. 9) of at least one SL PRS transmission burst on an unlicensed band. In operation 613, UE 601A may transmit an SL PRS in the indicated SL PRS transmission burst on the unlicensed band to UE 601B.

The SL PRS configuration may indicate information associated with the at least one SL PRS transmission burst in a slot. Each of the at least one SL PRS transmission burst may include at least one of a sensing region, an AGC region, and a PRS region. For each of at least one SL PRS transmission burst, the SL PRS configuration may indicate at least one of: the number of symbols of the sensing region of the corresponding SL PRS transmission burst, the number of symbols of the AGC region of the corresponding SL PRS transmission burst, the number of symbols of the PRS region of the corresponding SL PRS transmission burst, and the starting symbol of the AGC region of the corresponding SL PRS transmission burst or the starting symbol of the PRS region of the corresponding SL PRS transmission burst.

The SL PRS configuration may further indicate the number of SL PRS transmission bursts in the slot. The SL PRS configuration may further indicate an effective time of the SL PRS configuration. In some embodiments, the effective time of an SL PRS configuration may be preconfigured or predefined, for example, in standard(s). The SL PRS configuration may not indicate the effective time.

The SL PRS configuration may be transmitted or received on a downlink or a SL. For example, the SL PRS configuration may be transmitted from the network or BS to UE 601A and UE 601B via a downlink.

In some embodiments, the SL PRS indication may schedule the SL PRS configuration on the licensed band. For example, UE 601A may transmit the SL PRS configuration scheduled by the SL PRS indication to UE 601B.

In some embodiments, the SL PRS indication may indicate a slot-level offset as described above. In some embodiments, the offset may be preconfigured or predefined, for example, in standard(s). The SL PRS indication may not indicate the offset. In some embodiments, as described above, the size of a field for indicating the SL PRS transmission burst in the SL PRS indication may be determined based on the number of the at least one SL PRS transmission bursts.

Although in FIG. 6, a UE transmits the SL PRS indication, it should be appreciated by persons skilled in the art that the network or BS may transmit the SL PRS indication to a UE in some other embodiments of the present disclosure.

It should be appreciated by persons skilled in the art that the sequence of the operations in exemplary procedure 600 may be changed and some of the operations in exemplary procedure 600 may be eliminated or modified, without departing from the spirit and scope of the disclosure.

Figure 7:
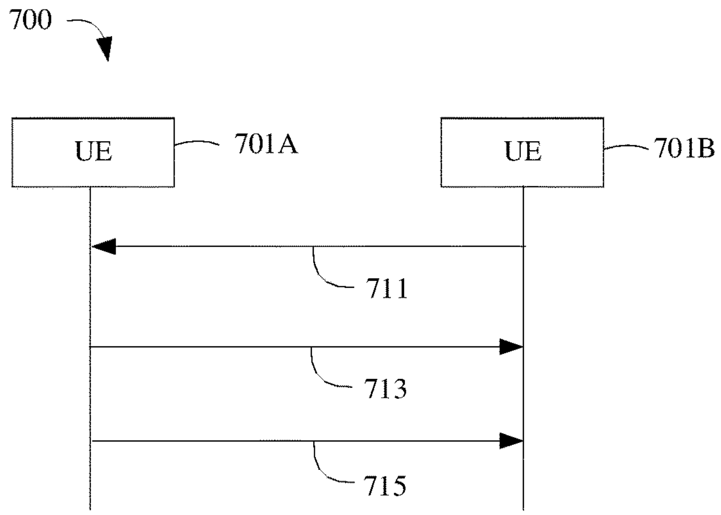
FIG. 7 illustrates a flow chart of an exemplary procedure of wireless communications in accordance with some embodiments of the present disclosure.

FIG. 7 illustrates a flow chart of an exemplary procedure 700 for requesting an SL PRS transmission in accordance with some embodiments of the present disclosure. Details described in all of the foregoing embodiments of the present disclosure are applicable for the embodiments shown in FIG. 7. In some examples, UE 701A and UE 701B may function as UE 101A or UE 101B in FIG. 1.

In operation 711, UE 701B may transmit to UE 701A an SL PRS request on a licensed band for requesting an SL PRS from UE 701A.

In some embodiments of the present disclosure, in response to the SL PRS request, UE 701A may perform an SL PRS transmission indication procedure as described with respect to FIGS. 6 and 9. For example, in operation 713, which may be similar to operation 611, UE 701A may transmit an SL PRS indication on the licensed band to UE 701B. In operation 715, which may be similar to operation 613, UE 701A may transmit the SL PRS in the indicated SL PRS transmission burst on the unlicensed band to UE 701B. The descriptions with respect to FIGS. 6 and 9 may apply here and thus are omitted herein.

Although in FIG. 7, a UE transmits the SL PRS request, it should be appreciated by persons skilled in the art that the network or BS may transmit the SL PRS request to a UE on the downlink to inform the UE to transmit the PRS on the sidelink in some other embodiments of the present disclosure.

It should be appreciated by persons skilled in the art that the sequence of the operations in exemplary procedure 700 may be changed and some of the operations in exemplary procedure 700 may be eliminated or modified, without departing from the spirit and scope of the disclosure.

In some embodiments of the present disclosure, a Tx UE may transmit the SL PRS according to the SL PRS configuration, without the participation of an SL PRS indication. For example, the Tx UE may transmit the SL PRS periodically according to the SL PRS configuration. The Rx UE may receive the SL PRS periodically according to the SL PRS configuration.

Figure 10:
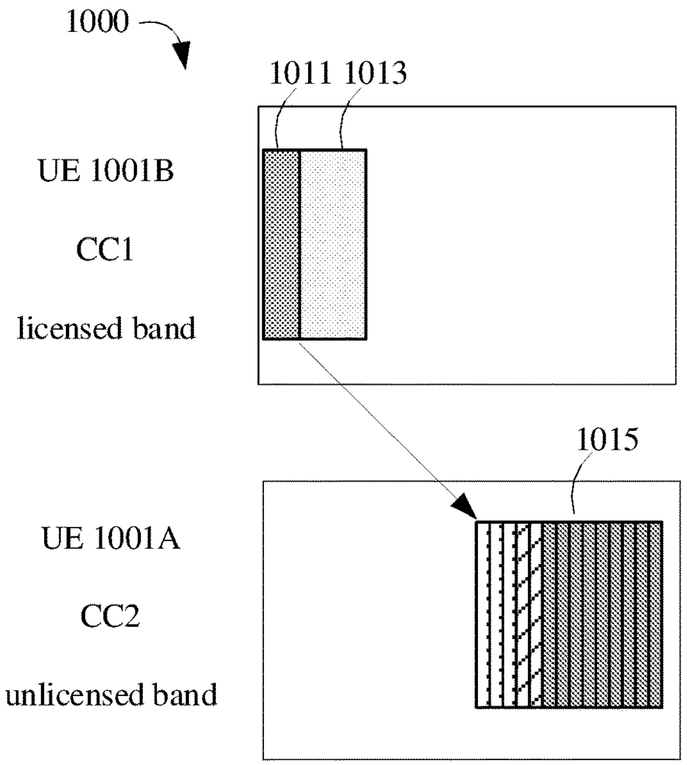
FIG. 10 illustrates a schematic diagram of scheduling an SL PRS transmission in accordance with some embodiments of the present disclosure.

FIG. 10 illustrates a schematic diagram 1000 of scheduling an SL PRS transmission in accordance with some embodiments of the present disclosure. Details described in all of the foregoing embodiments of the present disclosure are applicable for the embodiments shown in FIG. 10.

As shown in FIG. 10, UE 1001B may schedule an SL PRS transmission on CC2 in an unlicensed frequency band with scheduling information on CC1 on a licensed frequency band. For example, UE 1001B may transmit an SL PRS indication (may also be referred to "scheduling information") on the licensed band to schedule an SL PRS transmission burst on the unlicensed band. UE 1001A may transmit an SL PRS on the indicated SL PRS transmission burst.

For example, referring to FIG. 10, the SL PRS indication may be transmitted in control part 1011 on CC1 to schedule an SL PRS on SL PRS transmission burst 1015 on CC2. After UE 1001A receives the SL PRS indication on the licensed band, UE 1001A may transmit the SL PRS in the corresponding resource on the unlicensed band. In some embodiments, an SL PRS configuration may be scheduled by the SL PRS indication in control part 1011 and may be transmitted on the data part 1013 on CC1. In some embodiments, an SL PRS configuration may be configured by a higher layer (e.g., RRC) signaling. The descriptions with respect to the SL PRS indication and SL PRS configuration in all of the foregoing embodiments may apply here and thus are omitted herein.

Although in FIG. 10, an UE transmits the scheduling information, it should be appreciated by persons skilled in the art that the network or BS may transmit the scheduling information to a UE on the downlink to inform the UE to transmit the PRS on the sidelink in some other embodiments of the present disclosure.

Figure 8:
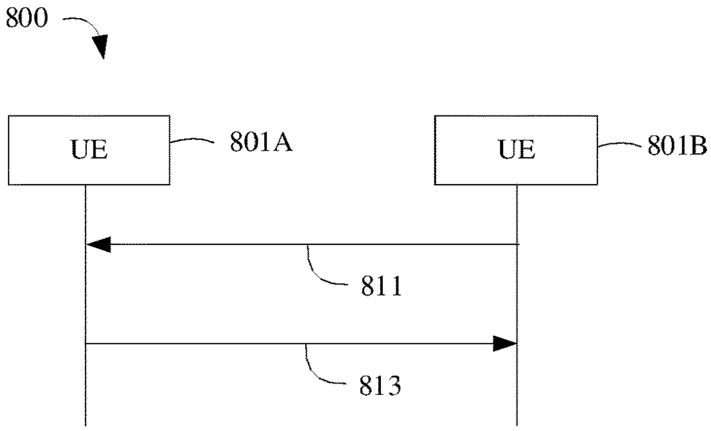
FIG. 8 illustrates a flow chart of an exemplary procedure of wireless communications in accordance with some embodiments of the present disclosure.

FIG. 8 illustrates a flow chart of an exemplary procedure 800 for scheduling an SL PRS transmission in accordance with some embodiments of the present disclosure. Details described in all of the foregoing embodiments of the present disclosure are applicable for the embodiments shown in FIG. 8. In some examples, UE 601A and UE 601B may function as UE 101A or UE 101B in FIG. 1.

In operation 811, UE 801B may transmit to UE 801A scheduling information on a licensed band. The scheduling information may schedule an SL PRS transmission on an unlicensed band from UE 801A. The scheduling information may be an SL PRS indication as described above. The SL PRS indication may indicate an SL PRS transmission burst (e.g., SL PRS transmission burst 1015 in FIG. 10) of at least one SL PRS transmission burst on an unlicensed band. In operation 813, UE 801A may transmit an SL PRS on the indicated SL PRS transmission burst.

The SL PRS configuration may indicate information associated with the at least one SL PRS transmission burst in a slot. Each of the at least one SL PRS transmission burst may include at least one of a sensing region, an AGC region, and a PRS region. For each of at least one SL PRS transmission burst, the SL PRS configuration may indicate at least one of: the number of symbols of the sensing region of the corresponding SL PRS transmission burst, the number of symbols of the AGC region of the corresponding SL PRS transmission burst, the number of symbols of the PRS region of the corresponding SL PRS transmission burst, and the starting symbol of the AGC region of the corresponding SL PRS transmission burst or the starting symbol of the PRS region of the corresponding SL PRS transmission burst.

The SL PRS configuration may further indicate the number of SL PRS transmission bursts in the slot. The SL PRS configuration may further indicate an effective time of the SL PRS configuration. In some embodiments, the effective time of an SL PRS configuration may be preconfigured or predefined, for example, in standard(s). The SL PRS configuration may not indicate the effective time.

The SL PRS configuration may be transmitted or received on a downlink or a SL. For example, the SL PRS configuration may be transmitted from the network or BS to UE 801A and UE 801B via a downlink.

In some embodiments, the SL PRS indication may schedule the SL PRS configuration on the licensed band. For example, UE 801B may transmit the SL PRS configuration scheduled by the SL PRS indication to UE 801A.

In some embodiments, the SL PRS indication may indicate a slot-level offset as described above. In some embodiments, the offset may be preconfigured or predefined, for example, in standard(s). The SL PRS indication may not indicate the offset. In some embodiments, as described above, the size of a field for indicating the SL PRS transmission burst in the SL PRS indication may be determined based on the number of the at least one SL PRS transmission bursts.

Although in FIG. 8, a UE transmits the scheduling information (e.g., SL PRS indication), it should be appreciated by persons skilled in the art that the network or BS may transmit the scheduling information to a UE in some other embodiments of the present disclosure.

It should be appreciated by persons skilled in the art that the sequence of the operations in exemplary procedure 800 may be changed and some of the operations in exemplary procedure 800 may be eliminated or modified, without departing from the spirit and scope of the disclosure.

Figure 11:
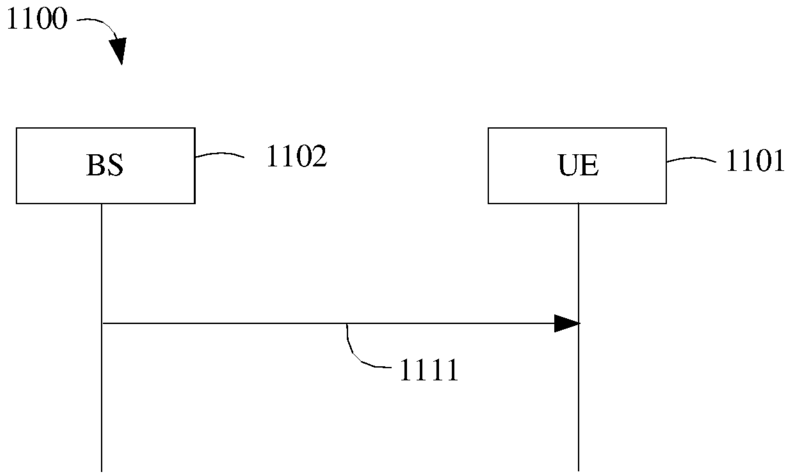
FIG. 11 illustrates a flow chart of an exemplary procedure of wireless communications in accordance with some embodiments of the present disclosure.

FIG. 11 illustrates a flow chart of an exemplary procedure 1100 of wireless communications in accordance with some embodiments of the present disclosure. Details described in all of the foregoing embodiments of the present disclosure are applicable for the embodiments shown in FIG. 11. In some examples, UE 1101 may function as UE 101A or UE 101B in FIG. 1 and BS 1102 may function as BS 102 in FIG. 1. UE 1101 may be a Tx UE of an SL PRS or an Rx UE of the SL PRS.

In some embodiments of the present disclosure, in operation 1111, BS 1102 may transmit an SL PRS indication on the downlink to UE 1101. The SL PRS indication may schedule an SL PRS configuration. BS 1102 may transmit the SL PRS configuration on the downlink to UE 1101 in operation 1113.

The SL PRS configuration may indicate information associated with at least one SL PRS transmission burst in a slot on an unlicensed band. Each of the at least one SL PRS transmission burst may include at least one of a sensing region, an AGC region, and a PRS region. For each of at least one SL PRS transmission burst, the SL PRS configuration may indicate at least one of: the number of symbols of the sensing region of the corresponding SL PRS transmission burst, the number of symbols of the AGC region of the corresponding SL PRS transmission burst, the number of symbols of the PRS region of the corresponding SL PRS transmission burst, and the starting symbol of the AGC region of the corresponding SL PRS transmission burst or the starting symbol of the PRS region of the corresponding SL PRS transmission burst.

The SL PRS configuration may further indicate the number of SL PRS transmission bursts in the slot. The SL PRS configuration may further indicate an effective time of the SL PRS configuration. In some embodiments, the effective time of an SL PRS configuration may be preconfigured or predefined, for example, in standard(s). The SL PRS configuration may not indicate the effective time.

In some embodiments, the SL PRS indication may indicate an SL PRS transmission burst (hereinafter, "first SL PRS transmission burst") of the at least one SL PRS transmission burst.

In some embodiments, the SL PRS indication may indicate a slot-level offset as described above. For example, the SL PRS indication may indicate an offset between a slot where the SL PRS indication is transmitted on the downlink and a slot where an SL PRS is transmitted in the first SL PRS transmission burst on the unlicensed band. In some embodiments, the offset may be preconfigured or predefined, for example, in standard(s). The SL PRS indication may not indicate the offset.

In some embodiments, as described above, the size of a field for indicating the first SL PRS transmission burst in the SL PRS indication may be determined based on the number of the at least one SL PRS transmission bursts.

In some embodiments of the present disclosure, in operation 1111, BS 1102 may transmit an SL PRS configuration to UE 1101. BS 1102 may not transmit an SL PRS indication to trigger the transmission of the SL PRS. For example, UE 1101 may transmit or receive the SL PRS periodically according to the SL PRS configuration.

In some embodiments of the present disclosure, in operation 1111, BS 1102 may transmit an SL PRS request or SL PRS scheduling information on the downlink to UE 1101. In some embodiments, the transmission of the SL PRS indication, the SL PRS configuration, or both may be in response to the SL PRS request or SL PRS scheduling information.

It should be appreciated by persons skilled in the art that the sequence of the operations in exemplary procedure 1100 may be changed and some of the operations in exemplary procedure 1100 may be eliminated or modified, without departing from the spirit and scope of the disclosure.

Figure 12:
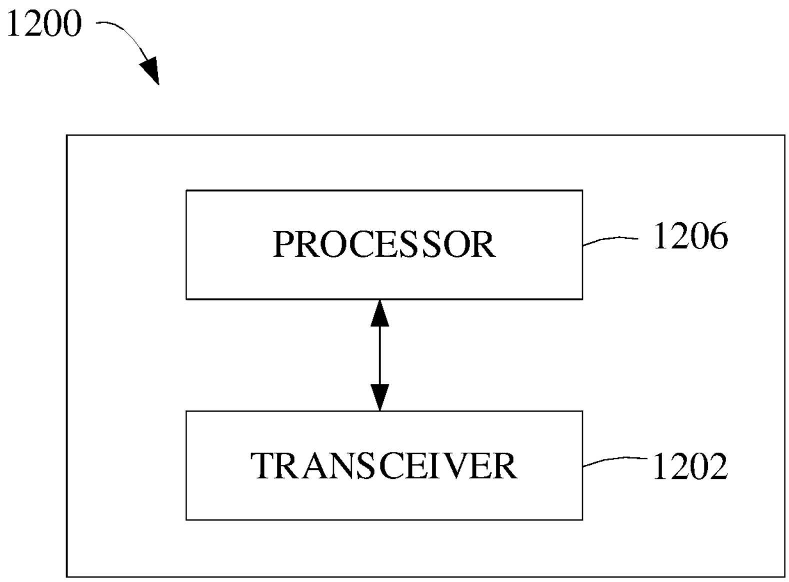
FIG. 12 illustrates a block diagram of an exemplary apparatus in accordance with some embodiments of the present disclosure.

FIG. 12 illustrates a block diagram of an exemplary apparatus 1200 according to some embodiments of the present disclosure.

As shown in FIG. 12, the apparatus 1200 may include at least one processor 1206 and at least one transceiver 1202 coupled to the processor 1206. The apparatus 1200 may be a network side apparatus (e.g., a BS) or a user side apparatus (e.g., a UE or an RSU).

Although in this figure, elements such as the at least one transceiver 1202 and processor 1206 are described in the singular, the plural is contemplated unless a limitation to the singular is explicitly stated. In some embodiments of the present application, the transceiver 1202 may be divided into two devices, such as a receiving circuitry and a transmitting circuitry. In some embodiments of the present application, the apparatus 1200 may further include an input device, a memory, and/or other components.

In some embodiments of the present application, the apparatus 1200 may be a UE or an RSU. The transceiver 1202 and the processor 1206 may interact with each other so as to perform the operations with respect to the UEs or RSUs described in FIGS. 1-11. In some embodiments of the present application, the apparatus 1200 may be a BS. The transceiver 1202 and the processor 1206 may interact with each other so as to perform the operations with respect to the BSs or networks described in FIGS. 1-11.

In some embodiments of the present application, the apparatus 1200 may further include at least one non-transitory computer-readable medium.

For example, in some embodiments of the present disclosure, the non-transitory computer-readable medium may have stored thereon computer-executable instructions to cause the processor 1206 to implement the method with respect to the UEs or RSUs as described above. For example, the computer-executable instructions, when executed, cause the processor 1206 interacting with transceiver 1202, so as to perform the operations with respect to the UEs or RSUs described in FIGS. 1-11.

In some embodiments of the present disclosure, the non-transitory computer-readable medium may have stored thereon computer-executable instructions to cause the processor 1206 to implement the method with respect to the BSs or networks as described above. For example, the computer-executable instructions, when executed, cause the processor 1206 interacting with transceiver 1202, so as to perform the operations with respect to the BSs or networks described in FIGS. 1-11.

Those having ordinary skill in the art would understand that the operations or steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations or steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including." Expressions such as "A and/or B" or "at least one of A and B" may include any and all combinations of words enumerated along with the expression. For instance, the expression "A and/or B" or "at least one of A and B" may include A, B, or both A and B. The wording "the first," "the second" or the like is only used to clearly illustrate the embodiments of the present application, but is not used to limit the substance of the present application.

What is claimed:

1. A base station for wireless communication, comprising:
at least one memory; and
at least one processor coupled with the at least one memory and configured to cause the base station to:
transmit a sidelink (SL) positioning reference signal (PRS) configuration on a downlink, wherein the SL PRS configuration indicates information associated with at least one SL PRS transmission burst in a slot on an unlicensed band, each of the at least one SL PRS transmission burst comprises a sensing region allocated for a listen-before-talk (LBT) procedure, an automatic gain control (AGC) region, and a PRS region; and
wherein the information associated with at least one SL PRS transmission burst indicates at least one of:
a number of symbols of the sensing region of the at least one SL PRS transmission burst,
a number of symbols of the AGC region of the at least one SL PRS transmission burst,
a number of symbols of the PRS region of the at least one SL PRS transmission burst, or
a starting symbol of the AGC region of the at least one SL PRS transmission burst or a starting symbol of the PRS region of the at least one SL PRS transmission burst.

2. A user equipment (UE) for wireless communication, comprising:
at least one memory; and
at least one processor coupled with the at least one memory and configured to cause the UE to:
transmit a sidelink (SL) positioning reference signal (PRS) on an unlicensed band according to an SL PRS configuration,
wherein the SL PRS configuration indicates information associated with at least one SL PRS transmission burst in a slot, each of the at least one SL PRS transmission burst comprises a sensing region allocated for a listen-before-talk (LBT) procedure, an automatic gain control (AGC) region, and a PRS region, and the SL PRS is transmitted on a first SL PRS transmission burst of the at least one SL PRS transmission burst; and
wherein the information associated with at least one SL PRS transmission burst indicates at least one of:
a number of symbols of the sensing region of the at least one SL PRS transmission burst,
a number of symbols of the AGC region of the at least one SL PRS transmission burst,
a number of symbols of the PRS region of the at least one SL PRS transmission burst, or a starting symbol of the AGC region of the at least one SL PRS transmission burst or a starting symbol of the PRS region of the at least one SL PRS transmission burst.

3. The UE of claim 2, wherein the information associated with at least one SL PRS transmission burst further indicates a number of SL PRS transmission bursts in the slot.

4. The UE of claim 2, wherein the SL PRS configuration further indicates an effective time of the SL PRS configuration.

5. The UE of claim 2, wherein the SL PRS configuration is received on a downlink or a SL.

6. The UE of claim 2, wherein the at least one processor is further configured to:

transmit an SL PRS indication on a licensed band, wherein the SL PRS indication indicates the first SL PRS transmission burst of the at least one SL PRS transmission burst.

7. The UE of claim 6, wherein the at least one processor is further configured to:

receive an SL PRS request on the licensed band, wherein the transmission of the SL PRS indication is in response to the SL PRS request.

8. The UE of claim 6, wherein the at least one processor is further configured to:

transmit the SL PRS configuration scheduled by the SL PRS indication on the licensed band.

9. The UE of claim 2, wherein the at least one processor is further configured to:

receive an SL PRS indication on a licensed band, wherein the SL PRS indication indicates the first SL PRS transmission burst of the at least one SL PRS transmission burst.

10. The UE of claim 9, wherein the at least one processor is further configured to:

receive the SL PRS configuration scheduled by the SL PRS indication on the licensed band.

11. The UE of claim 9, wherein the SL PRS indication is received on a downlink or a SL.

12. The UE of claim 9, wherein the SL PRS indication indicates an offset between a slot where the SL PRS indication is transmitted on the licensed band and a slot where the SL PRS is transmitted on the unlicensed band.

13. The UE of claim 9, wherein the SL PRS indication comprises a field to indicate the first SL PRS transmission burst, and a size of the field is determined based on a number of SL PRS transmission bursts in the slot.

14. A user equipment (UE) for wireless communication, comprising:

at least one memory; and at least one processor coupled with the at least one memory and configured to:

receive a sidelink (SL) positioning reference signal (PRS) on an unlicensed band according to an SL PRS configuration, wherein the SL PRS configuration indicates information associated with at least one SL PRS transmission burst in a slot, each of the at least one SL PRS transmission burst comprises a sensing region allocated for a listen-before-talk (LBT) procedure, an automatic gain control (AGC) region, and a PRS region, and the SL PRS is received on a first SL PRS transmission burst of the at least one SL PRS transmission burst; and wherein the information associated with at least one SL PRS transmission burst indicates at least one of:

a number of symbols of the sensing region of the at least one SL PRS transmission burst, a number of symbols of the AGC region of the at least one SL PRS transmission burst, a number of symbols of the PRS region of the at least one SL PRS transmission burst, or a starting symbol of the AGC region of the at least one SL PRS transmission burst or a starting symbol of the PRS region of the at least one SL PRS transmission burst.

15. The UE of claim 14, wherein the information associated with at least one SL PRS transmission burst further indicates a number of SL PRS transmission bursts in the slot.

16. The UE of claim 14, wherein the SL PRS configuration further indicates an effective time of the SL PRS configuration.

17. The UE of claim 14, wherein the at least one processor is further configured to:

receive an SL PRS indication on a licensed band, wherein the SL PRS indication indicates the first SL PRS transmission burst of the at least one SL PRS transmission burst.

18. The UE of claim 14, wherein the at least one processor is further configured to:

transmit an SL PRS indication on a licensed band, wherein the SL PRS indication indicates the first SL PRS transmission burst of the at least one SL PRS transmission burst.

19. The UE of claim 18, wherein the at least one processor is further configured to:

transmit the SL PRS configuration scheduled by the SL PRS indication on the licensed band.

20. A method performed by a user equipment (UE), the method comprising:

transmitting a sidelink (SL) positioning reference signal (PRS) on an unlicensed band according to an SL PRS configuration, wherein the SL PRS configuration indicates information associated with at least one SL PRS transmission burst in a slot, each of the at least one SL PRS transmission burst comprises a sensing region allocated for a listen-before-talk (LBT) procedure, an automatic gain control (AGC) region, and a PRS region, and the SL PRS is transmitted on a first SL PRS transmission burst of the at least one SL PRS transmission burst; and wherein the information associated with at least one SL PRS transmission burst indicates at least one of:

a number of symbols of the sensing region of the at least one SL PRS transmission burst, a number of symbols of the AGC region of the at least one SL PRS transmission burst, a number of symbols of the PRS region of the at least one SL PRS transmission burst, or a starting symbol of the AGC region of the at least one SL PRS transmission burst or a starting symbol of the PRS region of the at least one SL PRS transmission burst.

* * * * *